US008796368B2

(12) United States Patent
Jin et al.

(10) Patent No.: US 8,796,368 B2
(45) Date of Patent: *Aug. 5, 2014

(54) WATER-AND OIL-REPELLENT

(75) Inventors: Ji-Shan Jin, Ibaraki (JP); Sumiko Mouri, Ibaraki (JP); Katsuyuki Sato, Ibaraki (JP)

(73) Assignee: Unimatec Co., Ltd., Tokyo (JP)

( * ) Notice: Subject to any disclaimer, the term of this patent is extended or adjusted under 35 U.S.C. 154(b) by 521 days.

This patent is subject to a terminal disclaimer.

(21) Appl. No.: 12/739,028

(22) PCT Filed: Aug. 8, 2008

(86) PCT No.: PCT/JP2008/064277
§ 371 (c)(1),
(2), (4) Date: Apr. 21, 2010

(87) PCT Pub. No.: WO2009/054176
PCT Pub. Date: Apr. 30, 2009

(65) Prior Publication Data
US 2010/0249312 A1    Sep. 30, 2010

(30) Foreign Application Priority Data

Oct. 22, 2007  (JP) ................. 2007-273280

(51) Int. Cl.
*C08F 220/24* (2006.01)
*C08F 220/16* (2006.01)
*C08F 214/08* (2006.01)
*C08K 5/29* (2006.01)

(52) U.S. Cl.
USPC ........... 524/197; 524/520; 524/544; 524/755; 524/767; 524/805; 524/833; 524/834; 526/245; 526/320; 526/326; 526/343

(58) Field of Classification Search
USPC ......... 524/544, 805, 755, 767, 833, 834, 197, 524/520
See application file for complete search history.

(56) References Cited

U.S. PATENT DOCUMENTS

| 4,500,694 | A | * | 2/1985 | Ohmori et al. | 526/245 |
| 4,666,977 | A | * | 5/1987 | Kihara et al. | 524/805 |
| 4,742,140 | A | * | 5/1988 | Greenwood et al. | 526/245 |
| 6,121,372 | A | * | 9/2000 | Yamamoto et al. | 524/805 |
| 6,153,675 | A | * | 11/2000 | Yamamoto et al. | 524/58 |
| 7,615,592 | B2 | * | 11/2009 | Sagawa et al. | 524/507 |
| 7,820,745 | B2 | * | 10/2010 | Kashiwagi | 524/111 |
| 2009/0325849 | A1 | * | 12/2009 | Gotz et al. | 510/299 |

FOREIGN PATENT DOCUMENTS

| JP | 11-080710 | 3/1999 |
| JP | 2004-352976 | 12/2004 |
| JP | 2005-344032 | 12/2005 |
| WO | WO 00/58416 | 10/2000 |
| WO | WO 2004-035708 | 4/2004 |
| WO | WO 2005-105872 | 11/2005 |
| WO | WO 2005-118737 | 12/2005 |
| WO | WO 2006/022122 | 3/2006 |
| WO | WO 2008022985 A1 * | 2/2008 |

OTHER PUBLICATIONS

International Preliminary Report on Patentability (Chapter I) and Written Opinion from corresponding PCT/JP2008/064277, dated May 20, 2010, 7 pages.
Copy of International Search Report from corresponding PCT application No. PCT/JP2008/064277, dated Sep. 22, 2008, 4 pages.
Secchaku, *Technololgy on Adhesion & Sealing*, vol. 50, No. 5, p. 16-22, (2006).

\* cited by examiner

*Primary Examiner* — Nicole M Buie-Hatcher
(74) *Attorney, Agent, or Firm* — Brinks Gilson & Lione

(57) ABSTRACT

A water- and oil-repellent comprising an aqueous dispersion of a fluorine-containing copolymer including as a copolymerization unit (a) a perfluoroalkylalkyl (meth)acrylate represented by the general formula $C_nF_{2n+1}C_mH_{2m}OCOCR=CH_2$ (wherein R represents hydrogen atom or methyl group; n represents 4, 5, or 6; and m represents 1, 2, 3, or 4), (b) benzyl (meth)acrylate, (c) a fluorine-free polymerizable monomer other than benzyl (meth)acrylate, and (d) a cross-linkable group-containing polymerizable monomer; and a blocked isocyanate added to the aqueous dispersion in a weight ratio of 0.05 to 3.0 to the weight of the solid content of the aqueous dispersion.

2 Claims, No Drawings

WATER- AND OIL-REPELLENT

RELATED APPLICATION

This application is a 35 U.S.C. §371 national phase filing of International Patent Application No. PCT/JP2008/064277, filed Aug. 8, 2008, through which and to which priority is claimed under 35 U.S.C. §119 to Japanese Patent Application No. 2007-273280, filed Oct. 22, 2007.

TECHNICAL FIELD

The present invention relates to a water- and oil-repellent. More specifically, the present invention relates to a water- and oil-repellent of which washing resistance is improved.

BACKGROUND ART

The expression of water- and oil-repellency results from the low surface energy of fluorine, and, usually, fluorine-containing acrylate polymers are widely used as active ingredients of water- and oil-repellents. Previous various investigations have shown that the presence of crystallinity in a fluorine-containing polymer is necessary for expressing water- and oil-repellency in practical applications. In particular, it has been recognized that the hydrophobicity of a fluorine-containing polymer depends on the number of carbon atoms of a side-chain fluoroalkyl group and that the expression of crystallinity is observed when the number of carbon atoms is eight or more.

[Non-Patent Document 1] Secchaku (Adhesion), Vol. 50, No. 5, pp. 16-22 (2006)

Therefore, it has been regarded that a fluorine-containing polymer having a short fluoroalkyl group, i.e., a side-chain fluoroalkyl group having 7 or less, in particular, 6 or less carbon atoms, is low in or does not have crystallinity and thereby cannot provide water-repellent performance that is sufficient for practical use. In addition, since water and oil-repellents are required to have washing resistance and abrasion resistance, fluorine-containing acrylic polymers having long side chains are used.

However, polymers including a side-chain fluoroalkyl group having 8 or more carbon atoms are very hard due to their high crystallinity and have a problem that flexibility of textile products is impaired. Furthermore, since the water-repellent process needs high curing temperature, there are problems such as a change in color of fibers. In addition, since a long side-chain having 8 or more carbon atoms is excessively hydrophobic, a large amount of an emulsifier is necessary for producing a water- and oil-repellent.

The present applicant has before proposed a water and oil-repellent composed of an aqueous emulsion in which a copolymer of a fluoroalkyl group-containing polymerizable monomer and vinylidene chloride or benzyl (meth)acrylate, and a carboxyl group-containing water-soluble polymer are dispersed in water using a nonionic surfactant. The fluoroalkyl group of a fluoroalkyl group-containing polymerizable monomer that is copolymerized with vinylidene chloride or benzyl (meth)acrylate is recognized to be a perfluoroalkyl group having 4 to 20 carbon atoms, but the perfluoroalkyl group used in the above-mentioned polymerization example is recognized to be a mixture of perfluoroalkyl groups having 6 to 14 carbon atoms, 9.0 on average.

[Patent Document 1] JP-A-11-80710

Furthermore, as a water-dispersible water- and oil-repellent composition in which both the repeated washing resistance and the water pressure resistance of water- and oil-repellency are achieved, a water-dispersible water- and oil-repellent composition including as active ingredients (A) a fluorine-containing copolymer having a hydroxyl group, (B) a fluorine-containing copolymer having an epoxy group, (C) a compound having a blocked isocyanate group and not having a carbon-carbon unsaturated bond, and (D) an amino resin has been proposed. The fluorine-containing copolymers having the hydroxyl group or the epoxy group are each a copolymer of a polymerizable monomer having a polyfluoroalkyl group, wherein the number of carbon atoms of the perfluoroalkyl group of a perfluoroalkylalkyl group is 2 to 20, preferably 6 to 16. A perfluoropentyl group and a perfluorohexyl group are shown as examples, and in the Examples, a mixture of $F(CF_2)_m$ groups of which m is from 6 to 16 and is 9 on average is used.

[Patent Document 2] WO 00/58416

Accordingly, it is believed that a water- and oil-repellent showing excellent in flexibility and also excellent in washing resistance can be obtained if water- and oil-repellency can be expressed with a fluorine-containing polymer including a short fluoroalkyl group having 6 or less carbon atoms.

Furthermore, acrylic acid derivatives of perfluoroalkylalkyl alcohol, for example, $CF_3(CF_2)_7CH_2CH_2OCOCH=CH_2$, are widely used as synthetic monomers for fluorine-containing copolymer that forms a water- and oil-repellent for fiber, but recently, it has been reported that among these types of compounds, compounds including perfluoroalkyl groups having approximately 8 carbon atoms are high in bioaccumulation potential and therefore have an environmental problem. Accordingly, it is concerned that the manufacturing and the use of these compounds will become difficult in the future. However, compounds including perfluoroalkyl groups having 6 or less carbon atoms are recognized to be low in bioaccumulation potential.

It has been also proposed a surface-treating agent showing excellent water repellency, oil repellency, and antifouling property by using a polymer having a short fluoroalkyl group having 1 to 6 carbon atoms as the side chain, but the fluoroalkyl group-containing monomer used therein is a fluorine-containing monomer compound represented by the general formula:

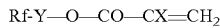
$$Rf\text{-}Y\text{---}O\text{---}CO\text{---}CX=CH_2$$

X: F, Cl, Br, I, $CFX^1X^2$, CN, a fluoroalkyl group having 1 to 20 carbon atoms, benzyl group, or phenyl group, Y: an aliphatic group having 1 to 10 carbon atoms, an aromatic or alicyclic group having 6 to 10 carbon atoms, a $CH_2CH_2NR^1SO_2$ group, or a $CH_2CH(OY^1)CH_2$ group, and Rf: a fluoroalkyl group having 1 to 6 carbon atoms.

Acrylic acid derivatives in which X is H are shown as comparative manufacturing examples, and methacrylic acid derivatives in which X is $CH_3$ are intendedly excluded.

[Patent Document 3] JP-A-2004-352976

Furthermore, it has been proposed a water- and oil-repellent composition of which essential component is a copolymer containing as a polymerization unit (a) an Rf group-containing monomer of which homopolymer does not have a melting point derived from the Rf group in the microcrystals or has a melting point of 55° C. or less and has a glass transition point of 20° C. or more and (b) an Rf group-free monomer having a cross-linkable functional group, wherein the composition can impart excellent water- and oil-repellency to products, even in low temperature treatment, and also can perform a water- and oil-repellent process with providing soft textile feeling and also excellent durability.

[Patent Document 4] WO 2004/035708

In the above, a perfluoroalkylalkyl (meth)acrylate is used as the component monomer (a), but a specific monomer, such as a 2-butanone oxime adduct, pyrazole adduct, or ϵ-caprolactam adduct of a ω-isocyanate alkyl(meth)acrylate, is used as the component monomer (b) in the copolymerization reaction.

Furthermore, the use of water- and oil-repellency processing treatment is extended to the outdoor field such as sportswear, and the water- and oil-repellency is required to be durable to repeated washing in such an application field. However, though the above-mentioned Patent Document 2 describes the water-dispersible water- and oil-repellent composition as that in which both the repeated washing resistance and the water resistance of water- and oil-repellency are achieved, a fluorine-containing copolymer including a perfluoroalkyl group having 6 or less carbon atom is not substantially used alone, and also the water-dispersible water- and oil-repellent composition can not impart sufficient water- and oil-repellency not only to synthetic fibers but also to natural fibers when it is used for water- and oil-repellency treatment.

DISCLOSURE OF THE INVENTION

Problems to be Solved by the Invention

It is an object of the present invention to provide a water- and oil-repellent that includes, as an active ingredient, a copolymer of a perfluoroalkylalkyl (meth)acrylate being low in bioaccumulation potential, and can impart sufficient water- and oil-repellency not only to synthetic fibers but also to natural fibers, and is also improved in washing resistance.

Means for Solving the Problems

Such an object of the preset invention is achieved by a water- and oil-repellent comprising an aqueous dispersion of a fluorine-containing copolymer including as a copolymerization unit (a) at least one of perfluoroalkylalkyl acrylates and corresponding methacrylates represented by the general formula:

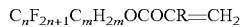

(wherein R represents hydrogen atom or methyl group; n represents 4, 5, or 6; and m represents 1, 2, 3, or 4), (b) benzyl acrylate or benzyl methacrylate, (c) a fluorine-free polymerizable monomer other than benzyl acrylate and benzyl methacrylate, and (d) a cross-linkable group-containing polymerizable monomer; and
a blocked isocyanate added to the aqueous dispersion in a weight ratio of 0.05 to 3.0 to the weight of the solid content of the aqueous dispersion.

Effect of the Invention

The water- and oil-repellent according to the present invention is a water- and oil-repellent of which an active ingredient is a copolymer of a perfluoroalkylalkyl (meth)acrylate being low in bioaccumulation potential, wherein the copolymer is not that in which a specific monomer is copolymerized; the curing temperature in water- and oil-repellent treatment using the copolymer as an active ingredient is low; and excellent textile feeling can be imparted to a water- and oil-repellent-treated fabric. In particular, the water- and oil-repellent can impart sufficient water- and oil-repellency not only to synthetic fibers but also to natural fibers, and is also excellent in washing resistance.

BEST MODE FOR CARRYING OUT THE INVENTION

Preferred examples of the component (a), perfluoroalkylalkyl (meth)acrylate, represented by the general formula:

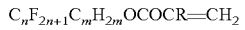

R: a hydrogen atom or a methyl group
n: 4, 5, or 6
m: 1, 2, 3, or 4
include the following compounds:

$C_4F_9CH_2CH_2OCOCH{=}CH_2$, $C_4F_9CH_2CH_2OCOC(CH_3){=}CH_2$,

The component (a), perfluoroalkylalkyl (meth)acrylate, is supplied to a copolymerization reaction in such a ratio that its proportion in the resulting copolymer is about 10 to 80% by weight, preferably about 25 to 80% by weight, and more preferably about 40 to 80% by weight. By the copolymerization of such a monomer component (a), an aqueous dispersion showing excellent in emulsion stability can be formed, and water- and oil-repellency is expressed.

The component (b), benzyl acrylate or benzyl methacrylate, is supplied to the copolymerization reaction in such a ratio that its proportion in the resulting copolymer is about 5 to 80% by weight, preferably about 5 to 50% by weight, and more preferably about 5 to 35% by weight. By the copolymerization of the benzyl (meth)acrylate, the copolymer shows a good film-forming property and orientation.

As the component (c), fluorine-free polymerizable monomer, for example, at least one of vinylidene chlorides, alkyl (meth)acrylates including straight-chain or branched alkyl groups having 1 to 18 carbon atoms, cycloalkyl (meth)acrylates, alkoxyalkyl (meth)acrylates including alkoxyalkyl groups having 2 to 6 carbon atoms, monoalkyl esters or dialkyl esters of maleic acid or fumaric acid including an alkyl group having 1 to 8 carbon atoms, and vinyl esters such as vinyl acetate and vinyl caprylate is preferably used from the balance of water- and oil-repellency. In addition, another examples of the fluorine-free polymerizable monomer include copolymerizable vinyl compounds, such as styrene, methylstyrene, methylstyrene, vinylnaphthalene, (meth)acrylonitrile, acetone acrylamide, vinyl chloride, chloroethyl vinyl ether, a hydroxyalkyl vinyl ether including an alkyl group having 1 to 4 carbon atoms, polyethylene glycol mono(meth)acrylate, and polypropylene glycol mono(meth)acrylate. Furthermore, a diene compound such as isoprene, pentadiene, or butadiene can be copolymerized.

The fluorine-free polymerizable monomer other than benzyl (meth)acrylates is supplied to the copolymerization reaction in such a ratio that its proportion in the resulting copolymer is about 5 to 80% by weight, preferably about 5 to 60% by weight, and more preferably about 5 to 40% by weight.

Examples of the component (d), cross-linkable group-containing polymerizable monomer, include epoxy group-containing monomers such as allyl glycidyl ether and glycidyl (meth)acrylate; N-methylol group-containing monomers such as N-methylol (meth)acrylamide and N-butoxymethylol/(meth)acrylamide; hydroxyalkyl group-containing monomers such as 2-hydroxyethyl (meth)acrylate, 2-hydroxypropyl acrylate, 4-hydroxybutyl acrylate, and 2-hydroxy-3-chloropropyl (meth)acrylate; amide group-containing monomers such as (meth)acrylamide, N-methyl acrylamide, diacetone acrylamide; and compounds represented by the formula:

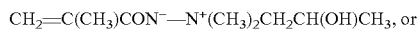

aziridinyl group-containing monomers such as aziridinylethyl (meth)acrylate; and polyol poly(meth)acrylates such as ethylene glycol di(meth)acrylate, polyoxyethylene di(meth)acrylate, and polyoxypropylene glycol di(meth)acrylate. Hydrophilic monomers are preferably used.

Further copolymerization of the cross-linkable group-containing polymerizable monomer strengthens the adhesion, to base materials such as fibers, of the fluorine-containing copolymer used as an active component for water- and oil-repellency; also shows an effect of improving, for example, the durability, washing resistance, and dry-cleaning resistance of the water- and oil-repellent; and also usually gives a secondary effect of improving the polymerization stability during emulsion polymerization. Therefore, the component (d) is used in such a ratio that its proportion in the copolymer is about 0.5 to 40% by weight and preferably about 1 to 15% by weight.

The copolymerization reaction using these polymerizable monomers is performed by emulsion polymerization in the presence of a surface-active emulsifier composed of a polyethylene oxide adduct type nonionic surfactant and in the presence of an emulsifying aid composed of a glycol-based compound. The ratio of the surface-active emulsifier is about 1 to 20% by weight and preferably about 1 to 10% by weight, and the ratio of the emulsifying aid is about 10 to 100% by weight and preferably about 15 to 70% by weight, based on the total amount of the monomers for the copolymerization.

As the polyethylene oxide adduct type nonionic surfactant for example, a reaction product of a polyethylene oxide with an alcohol such as an aliphatic alcohol or an aromatic alcohol, an alkyl ether, oleic acid, a C.sub.12 to C.sub.18 alkylamine, or sorbitan mono fatty acid is used.

Examples of the glycol compound as the emulsifying aid used in a combination with the emulsifier include ethylene glycol, polyethylene (n=2 to 4 or more) glycol, propylene glycol, polypropylene (n=2 to 4 or more) glycol, their terminal monomethyl ethers, hexylene glycol, and propylene glycol adducts of glycerin. A polypropylene glycol-based compound having a molecular weight of about 300 to 3000 or hexylene glycol is preferably used.

Prior to the copolymerization reaction, a polymerizable monomer mixture containing a perfluoroalkylalkyl (meth)acrylate and another polymerizable monomer is subjected to emulsification treatment in the presence of a surface-active emulsifier and an emulsifying aid. The emulsification treatment is sufficiently carried out using a high-pressure homogenizer or the like.

The copolymerization reaction of the emulsified polymerizable monomer mixture is performed in the presence of a radical polymerization initiator added to the reaction system. The radical polymerization initiator may be any of organic peroxides, azo compounds, and persulfates. Preferably, a water-soluble organic peroxide, for example, 2,2'-azobis(2-amidinopropane)-dihydrochloride, is used in a ratio of about 0.1 to 10% by weight and preferably about 0.5 to 7% by weight to the total weight of the polymerizable monomer mixture.

The copolymerization reaction is carried out in an aqueous solvent at about 40 to 80° C. for about 1 to 10 hours to form an aqueous dispersion (aqueous emulsion) serving as a stock solution having a solid content concentration of about 15 to 35% by weight. As the aqueous solvent, in addition to the use of water alone, preferably used an aqueous solvents containing about 1 to 30% by weight of a water-soluble organic solvent, for example, a ketone such as acetone or methyl ethyl ketone, an alcohol such as methanol or ethanol, or a glycol such as ethylene glycol, propylene glycol, dipropylene glycol, a monomethyl ether thereof, or a tripropylene glycol. In the reaction, a molecular weight modifier may be used, and, for example, an alkyl mercaptan such as n-octyl mercaptan, n-dodecyl mercaptan, or tertiary dodecyl mercaptan is preferably used.

To the resulting aqueous dispersion (aqueous emulsion), a blocked isocyanate is added as an cross-linking agent in a weight ratio of 0.05 to 3.0, preferably 0.2 to 2.0, to the weight of solid content of the aqueous dispersion. The blocked isocyanate can impart excellent water-repellency and high washing resistance to also natural fibers such as cotton. When the amount of the blocked isocyanate is lower than the abovementioned ratio, the washing resistance is decreased. On the other hand, when the blocked isocyanate is used in an amount higher than the ratio, the textile feeling of a fabric is deteriorated.

[Patent Document 5] WO 2005/118737

The blocked isocyanate herein is a compound having one or more blocked isocyanate group and not having a polymerizable carbon-carbon unsaturated bond, i.e., a compound having a structure in which the isocyanate group is blocked with a blocking agent. As such a blocked isocyanate, a preferred structure is obtained by reacting a polyisocyanate and a compound having two or more active hydrogen atoms in a molecule thereof and blocking the isocyanate group of the resulting compound with a blocking agent.

Examples of the polyisocyanate include aromatic isocyanates such as 4,4'-diphenylmethane diisocyanate, 2,4'-diphenylmethane diisocyanate, and tolylene diisocyanate; aliphatic isocyanates such as trimethylene diisocyanate, tetramethylene diisocyanate, pentamethylene diisocyanate, hexamethylene diisocyanate, 1,2-propane diisocyanate, 1,2-butane diisocyanate, trimethylhexamethylene diisocyanate, isophorone diisocyanate, 4,4'-dicyclohexylmethane diisocyanate, and cyclohexylene diisocyanate; and their isocyanurate modified compounds, prepolymer modified compounds, biuret modified compounds, and allophanate modified compounds.

The compound having two or more active hydrogen atoms in the molecule is preferably a polyol or a polyamine. Examples of the polyol include ethylene glycol, propylene glycol, butanediols, pentanediols, hexanediols, glycerin, trimethylolpropane, pentaerythritol, sorbitol, neopentyl glycol, bisphenol A, xylylene glycol, and at least one of modified compounds of these alcohols. Examples of the polyamine include hexamethylenediamine and 3,3'-iminobispropylamine. The polyol herein may be a polyester polyol, and as the polyester polyol, those having an ester bond obtained by a reaction of a polyol and a polyvalent carboxylic acid such as phthalic acid, adipic acid, fumaric acid, pyromellitic acid, trimellitic acid, aliphatic dicarboxylic acid, or a derivative thereof are used.

As the blocking agent for the isocyanate, alkyl ketone oximes, phenols, alcohols, β-diketones, and lactams are used, and preferably, methyl ethyl ketone oxime, ε-caprolactam, phenol, cresol, acetylacetone, diethyl malonate, isopropyl alcohol, tert-butyl alcohol, and maleic acid imide, more preferably compounds having a dissociation temperature of from 120 to 180° C. represented by dialkyl ketone oximes such as methyl ethyl ketone oxime and lactams such as ε-caprolactam are used.

The blocked isocyanate is obtained by, as described above, reacting a polyol to an isocyanate compound and then reacting the resulting compound to a blocking agent. These reactions are preferably performed in a non-aqueous solvent such as ketones, ethers, or hydrocarbons. In addition, it is preferable that the equivalent weights of the isocyanate compound, the compound having two or more active hydrogen atoms, and the blocking agent become equal to one another at the time of completion of all the reactions.

After the above-described blocking reaction, the blocked isocyanate is preferably emulsified with water and a nonionic emulsifier, a nonionic/cationic emulsifier, or a nonionic/anionic emulsifier, in particular, a nonionic/cationic emulsifier. The solvent is removed after the emulsification, according to need.

As the blocked isocyanate, commercially available products, for example, RucoGuard XTS, a Rudolf product; RucoGuard WEB, a Rudolf product; NK Assist-NY, a Nikka Chemical product; NK Assist-V, a Nikka Chemical product; NK Assist-FU, a Nikka Chemical product; Prominate XC-830, a Gantsu Chemical product; Prominate XC-915, a Gantsu Chemical product; Prominate XC-950, a Gantsu Chemical product; and Elastron BN-69, a Daiichi Kogyo Seiyaku product can be used as such.

The aqueous dispersion can further contain other additives indispensable for the water- and oil-repellent use, for example, a cross-linking agent other than the blocked isocyanate, such as a melamine resin or a urea resin, a polymer extender, another water-repellent such as a silicone resin or oil, or wax, an insecticide, an antistatic agent, a dye stabilizer, an anticreasing agent, and a stain blocker.

The thus obtained aqueous dispersion containing the block isocyanate is diluted with water, preferably with ion-exchanged water to give a solid content concentration of about 0.1 to 10% by weight, and then is effectively applied, as a water- and oil-repellent, to, for example, fibers, a fabric, a woven fabric, paper, a film, a carpet, or a fabric product made of filaments, threads, or fibers. The application is performed by coating, dipping, spraying, padding, roll coating, or a combination thereof. For example, a bath containing a solid content in a concentration of about 0.1 to 10% by weight is used as a pad bath. A material to be treated is padded in this pad bath and is then subjected to removal of excessive liquid with a squeezing roller, followed by drying, thereby allowing the fluorine-containing copolymer to adhere to the material to be treated in a ratio of about 0.01 to 10% by weight to the amount of the material. Subsequently, drying, which varies depending on the type of the material to be treated, is usually conducted at about 100 to 120° C. for about from 1 minute to 2 hours to complete the water- and oil-repellent treatment.

EXAMPLES

Next, the present invention will be described with reference to Examples. Note that percentage in parentheses means % by weight.

Reference Example 1

| | |
|---|---|
| 2-(n-Perfluorohexyl)ethyl methacrylate | 58.3 g (45.6%) |
| Benzyl methacrylate | 29.2 g (22.8%) |
| 2-Hydroxyethyl methacrylate | 5.6 g (4.4%) |
| Polyethylene glycol (n = 4) monomethacrylate (PE-200, a NOF product) | 11.7 g (9.1%) |
| Lauryl mercaptan (chain transfer agent) | 0.5 g |
| Polyoxyethylene polycyclic phenyl ether (surfactant) (Newcol-740, a Nippon Nyukazai product) | 7.0 g |
| Hexylene glycol (emulsifying aid) | 35.0 g |
| Ion-exchanged water | 267.1 g |

The above-mentioned components were put in a 1-L glass reaction vessel and were mixed, and further subjected to emulsification mixing using a high-pressure homogenizer. The resulting emulsion was substituted by nitrogen gas for 30 minutes. Then, the inner temperature of the reaction vessel was gradually increased to 40° C., and then

| | |
|---|---|
| vinylidene chloride | 17.5 g (13.7%) |
| N-methylol acrylamide (dissolved in 29.3 g of ion-exchanged water) | 5.6 g (4.4%) |
| 2,2'-azobis(2-amidinopropane)·dihydrochloride (dissolved in 30.4 g of ion-exchanged water) | 2.8 g | were added thereto (the total amount including 285.5 g of total ion-exchanged water was 500.0 g). Furthermore, the inner temperature was gradually increased to 70° C., followed by the reaction at the temperature for 4 hours. After the completion of the reaction and cooling, an aqueous dispersion having a solid content concentration of 25.0% by weight was obtained. The melting point (DSC method) of the copolymer separated from the aqueous dispersion was 45° C.

Reference Examples 2 to 4

In Reference Example 1, aqueous dispersions B to D each having a solid content concentration of 25.0% by weight (excluding Reference Example 2 in which the concentration is 25.3% by weight) were prepared by changing the kinds and the amounts of the comonomers (a) to (d) and the total amount of ion-exchanged water to those shown in Table 1. In Table 1, the melting points (DSC method) of the copolymers that are obtained by separating them from the aqueous dispersions are also shown.

TABLE 1

| Comonomer | Reference Example 2 | | Reference Example 3 | | Reference Example 4 | |
|---|---|---|---|---|---|---|
| | g | % | g | % | g | % |
| Component (a) | | | | | | |
| FAMAC-6 | 78.5 | 61.5 | 100.6 | 79.1 | 62.8 | 49.2 |
| FAAC-6 | | | | | 15.7 | 12.3 |
| Component (b) | | | | | | |
| BzMA | 22.4 | 17.6 | 7.4 | 5.8 | 22.4 | 17.6 |
| Component (c) | | | | | | |
| PEGM | 4.2 | 3.3 | 4.2 | 3.3 | 4.2 | 3.3 |
| VDC | 11.2 | 8.8 | 3.8 | 3.0 | 11.2 | 8.8 |
| Component (d) | | | | | | |
| HEA | 5.6 | 4.4 | 5.6 | 4.4 | 5.6 | 4.4 |
| NMAM | 5.6 | 4.4 | | | 5.6 | 4.4 |
| NMMA | | | 5.6 | 4.4 | | |

TABLE 1-continued

|  | Reference Example 2 | | Reference Example 3 | | Reference Example 4 | |
|---|---|---|---|---|---|---|
| Comonomer | g | % | g | % | g | % |
| Total amount of water (g) | 323.5 | | 327.5 | | 327.2 | |
| Aqueous dispersion | B | | C | | D | |
| Copolymer melting point (° C.) | 44 | | 46 | | 44 | |

Notes)
FAMAC-6: 2-(perfluorohexyl)ethyl methacrylate
FAAC-6: 2-(perfluorohexyl)ethyl acrylate
BzMA: benzyl methacrylate
PEGM: polyethylene glycol (n = 4) monomethacrylate (PE-200)
VDC: vinylidene chloride
HEA: 2-hydroxyethyl acrylate
NMAM: N-methylol acrylamide
NMMA: N-methylol methacrylamide Example 1

To 2.0 parts by weight (corresponding to 0.5 parts by weight of the solid content) of the aqueous dispersion A prepared in Reference Example 1, 0.375 parts by weight (corresponding to 0.15 parts by weight of the solid content) of an aqueous emulsion containing 2-butanone-o,o'[methylenebis (4,1-phenyleneaminocarboxy)] dioxime (abbreviation: MDI-BTO) as the blocked isocyanate were added, followed by dilution with 97.625 parts by weight of ion-exchanged water to give a water- and oil-repellent A.

Examples 2 to 4

In Example 1, a water- and oil-repellents B to D were prepared by using each of the aqueous dispersions B to D, respectively prepared in Reference Examples 2 to 4, in the same amount.

Example 5

In Example 1, a water- and oil-repellent E was prepared by changing the amount of the aqueous emulsion of MDI-BTO as the blocked isocyanate to 1.25 parts by weight and the amount of ion-exchanged water to 96.75 parts by weight.

Example 6

In Example 1, a water- and oil-repellent F was prepared by changing the amount of the aqueous emulsion of MDI-BTO as the blocked isocyanate to 0.125 parts by weight and the amount of ion-exchanged water to 97.875 parts by weight.

Comparative Example 1

A water- and oil-repellent G was prepared by diluting 2.0 parts by weight of the aqueous dispersion A, prepared in Reference Example 1, with 98.0 parts by weight of ion-exchanged water.

Comparative Examples 2 to 4

In Comparative Example 1, water and oil-repellents H to J were prepared by using each of the aqueous dispersions B to D, respectively prepared in Reference Examples 2 to 4, in the same amount.

To the thus obtained water- and oil-repellents A-J a cotton fabric, a cotton/polyester blended fabric, a polyester fabric, or a nylon fabric was immersed therein for measuring water-repellency (according to JIS L1092) and oil-repellency (according to AATCC-TM118-1992). The wet pick-ups after squeezing were 80% for the cotton fabric and 100% for the cotton blended fabric, 40% for the polyester fabric, and 60% for the nylon fabric. The drying conditions were 80° C. for 10 minutes, and the curing conditions were 150° C. for 3 minutes, for all the fabrics.

The evaluation criteria for water-repellency were defined in conformity with the rules of the above-mentioned JIS.

| Degree of water-repellency | Condition |
|---|---|
| 100 | Showing no wet state and adhesion of water droplets on the surface |
| 90 | Showing little adhesion of water droplets on the surface |
| 80 | Partially showing separate wet state on the surface |
| 70 | Showing wet state on a half area of the surface |
| 50 | Showing wet state on the entire surface |
| 0 | Showing complete wet state on both surfaces |

The evaluation criteria for oil-repellency were defined in conformity with the rules of the above-mentioned AATCC. A drop of a test solution was dropped onto an oil-repellent treated fabric, and conditions at 30 seconds after the dropping were investigated. When the test solution dropped was held on the fabric, a test using a test solution having a larger number was further conducted. The oil-repellency was evaluated with the test solution that was the limit for being held on the fabric and on the basis of the oil-repellency evaluation shown in the following table (when Nujol is not held at all (100%), it is defined 0).

| Oil-repellency No. | Test solution | Surface tension (mN/m, 25° C.) |
|---|---|---|
| 8 | n-heptane | 20.0 |
| 7 | n-octane | 21.8 |
| 6 | n-decane | 23.5 |
| 5 | n-dodecane | 25.0 |
| 4 | n-tetradecane | 26.7 |
| 3 | n-hexadecane | 27.3 |
| 2 | Nujol/n-hexadecane (volume ratio: 65%:35%) | 29.6 |
| 1 | Nujol | 31.2 |

[Washing Resistance Test]

A cotton fabric, a cotton/polyester blend fabric, a polyester fabric, or a nylon fabric was each subjected to water- and oil-repellency treatment with each of the water- and oil-repellents A to J, as described above, and then washed 5 times or 10 times according to the water washing method defined by JIS L0217, Appendix Table 103 and then air-dried, followed by evaluation for water-repellency and oil-repellency. The evaluation results are shown in the form of water-repellency evaluation/oil-repellency evaluation in the following Table 2.

TABLE 2

| Example | Water- and oil-repellent | Water-repellency evaluation/ Oil-repellency evaluation | | | |
| --- | --- | --- | --- | --- | --- |
| | | Cotton Fabric | Blended Fabric | Polyester Fabric | Nylon Fabric |
| [Number of washing: 0 times] | | | | | |
| Example 1 | A | 100/1 | 100/4 | 100/4 | 100/5 |
| Example 2 | B | 100/4 | 100/5 | 100/5 | 100/6 |
| Example 3 | C | 100/5 | 100/5 | 100/6 | 100/6 |
| Example 4 | D | 100/5 | 100/5 | 100/6 | 100/6 |
| Example 5 | E | 100/4 | 100/5 | 100/5 | 100/6 |
| Example 6 | F | 100/4 | 100/5 | 100/5 | 100/6 |
| Comp. Ex. 1 | G | 100/1 | 100/4 | 100/4 | 100/5 |
| Comp. Ex. 2 | H | 100/3 | 100/5 | 100/5 | 100/6 |
| Comp. Ex. 3 | I | 100/5 | 100/5 | 100/6 | 100/6 |
| Comp. Ex. 4 | J | 100/5 | 100/5 | 100/6 | 100/6 |
| [Number of washing: 5 times] | | | | | |
| Example 1 | A | 100/1 | 100/4 | 100/4 | 100/6 |
| Example 2 | B | 100/4 | 100/5 | 100/5 | 100/6 |
| Example 3 | C | 100/5 | 100/5 | 100/6 | 100/6 |
| Example 4 | D | 100/4 | 100/5 | 100/6 | 100/6 |
| Example 5 | E | 100/4 | 100/4 | 100/4 | 100/6 |
| Example 6 | F | 100/3 | 100/5 | 100/5 | 100/6 |
| Comp. Ex. 1 | G | 70/0 | 80/1 | 100/4 | 100/5 |
| Comp. Ex. 2 | H | 70/2 | 100/4 | 100/5 | 100/6 |
| Comp. Ex. 3 | I | 70/3 | 100/4 | 100/6 | 100/6 |
| Comp. Ex. 4 | J | 70/3 | 100/4 | 100/6 | 100/6 |
| [Number of washing: 10 times] | | | | | |
| Example 1 | A | 70/1 | 100/3 | 100/4 | 100/5 |
| Example 2 | B | 90/3 | 100/4 | 100/5 | 100/5 |
| Example 3 | C | 90/3 | 100/4 | 100/6 | 100/6 |
| Example 4 | D | 90/4 | 100/5 | 100/5 | 100/6 |
| Example 5 | E | 90/3 | 100/4 | 100/5 | 100/5 |
| Example 6 | F | 90/3 | 100/4 | 100/5 | 100/5 |
| Comp. Ex. 1 | G | 50/0 | 70/0 | 100/4 | 100/4 |
| Comp. Ex. 2 | H | 70/1 | 80/4 | 100/5 | 100/5 |
| Comp. Ex. 3 | I | 70/1 | 80/4 | 100/5 | 100/5 |
| Comp. Ex. 4 | J | 70/1 | 80/4 | 100/5 | 100/5 |

The invention claimed is:

1. A water- and oil-repellent consisting of (A) an aqueous dispersion of a fluorine-containing copolymer, obtained by emulsion polymerization of:

(a) at least one of perfluoroalkylalkyl acrylates and corresponding methacrylates represented by the general formula:

$$C_nF_{2n+1}C_mH_{2m}OCOCR{=}CH_2$$

wherein R represents hydrogen atom or methyl group; n represents 4, 5, or 6; m represents 1, 2, 3, or 4, (b) benzyl acrylate or benzyl methacrylate, (c) vinylidene chloride, and (d) a cross-linkable group-containing polymerizable monomer;

in the presence of a polyethylene oxide adduct type nonionic surfactant and an emulsifying aid composed of glycol-based compound, and (B) a blocked isocyanate added to the aqueous dispersion (A) in a weight ratio of 0.05 to 3.0 to the weight of the solid content of the aqueous dispersion (A), wherein the fluorine-containing copolymer has a copolymerization composition of 10 to 80% by weight of the component (a), 5 to 80% by weight of the component (b), 5 to 80% by weight of the component (c), and 0.5 to 40% by weight of the component (d).

2. The water- and oil-repellent according to claim 1, wherein the component (d), cross-linkable group-containing polymerizable monomer, of the fluorine-containing copolymer is a hydrophilic monomer.

* * * * *